(12) United States Patent
Zhang et al.

(10) Patent No.: US 8,396,247 B2
(45) Date of Patent: Mar. 12, 2013

(54) RECOGNIZING ACTIONS OF ANIMATE OBJECTS IN VIDEO

(75) Inventors: Zhengyou Zhang, Bellevue, WA (US); Wanqing Li, Oatley (AU); Zicheng Liu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1069 days.

(21) Appl. No.: 12/183,078

(22) Filed: Jul. 31, 2008

(65) Prior Publication Data

US 2010/0027835 A1      Feb. 4, 2010

(51) Int. Cl.
*G06K 9/00* (2006.01)
(52) U.S. Cl. ...................................................... 382/103
(58) Field of Classification Search .................. 823/103, 823/118; 382/103, 118
See application file for complete search history.

(56) References Cited

U.S. PATENT DOCUMENTS

| | | | |
|---|---|---|---|
| 5,663,514 | A | 9/1997 | Usa |
| 5,886,788 | A | 3/1999 | Kobayashi |
| 6,249,606 | B1 | 6/2001 | Kiraly |
| 7,088,846 | B2 | 8/2006 | Han |
| 7,200,266 | B2 | 4/2007 | Ozer |
| 2004/0120581 | A1 | 6/2004 | Ozer et al. |
| 2004/0131254 | A1 | 7/2004 | Liang |
| 2004/0151366 | A1 | 8/2004 | Nefian |
| 2005/0084141 | A1 | 4/2005 | Kato |
| 2006/0062478 | A1 | 3/2006 | Cetin |
| 2006/0093188 | A1 * | 5/2006 | Blake et al. ................... 382/103 |

OTHER PUBLICATIONS

Ren, "Human Action Recognition in Smart Classroom", Fifth IEEE International Conference on Automatic Face and Gesture Recognition, 2002, May 21, 2002. pp. 417-422.
Oikonomopoulos, et al., "Trajectory-Based Representation of Human Actions", Lecture Notes on Artificial Intelligence, Spec. vol. AI for Human Computing, 2007. pp. 1-22.
Setiawan, et al., "Gaussian Mixture Model in Improved HLS Color Space for Human Silhouette Extraction", ICAT 2006, LNCS 4282. 2006. pp. 732-741.
Nguyen, et al., "Learning and Detecting Activities From Movement Trajectories Using the Hierarchical Hidden Markov Models," in Proc CVPR'05, 2005. pp. 1-6.
Ali, et al., "Chaotic Invariants for Human Action Recognition," in Proc. CVPR'07, 2007. pp. 1-8.
Galata, et al., "Learning Variable-Length Markov Models of Behaviour," Computer Vision and Image Understanding, vol. 81, 2001. pp. 1-33.
Moeslund, et al., "A Survey of Advances in Vision-Based Human Motion Capture and Analysis," Computer Vision and Image Understanding, vol. 104, 2006. pp. 90-126.
Oikonomopoulos, et al., "Spatiotemporal Salient Points for Visual Recognition of Human Actions," IEEE SMC-B, vol. 36, 2006. pp. 710-719.
Niebles, et al., "A Hierarchical Model of Shape and Appearance for Human Action Classification," in Proc. CVPR'07, 2007. pp. 1-8.

(Continued)

*Primary Examiner* — Claire X Wang

(57) ABSTRACT

A system that facilitates automatically determining an action of an animate object is described herein. The system includes a receiver component that receives video data that includes images of an animate object. The system additionally includes a determiner component that accesses a data store that includes an action graph and automatically determines an action undertaken by the animate object in the received video data based at least in part upon the action graph. The action graph comprises a plurality of nodes that are representative of multiple possible postures of the animate object. At least one node in the action graph is shared amongst multiple actions represented in the action graph.

20 Claims, 15 Drawing Sheets

OTHER PUBLICATIONS

Lv, et al., "Recognition and Segmentation of 3-D Human Action Using HMM and Multi-Class Adaboost," in 9th European Conf. on Computer Vision (ECCV'06), vol. 4, 2006. pp. 359-372.

Yilmaz, et al., "Actions Sketch: A Novel Action Representation," in Proc. CVPR, vol. 1, 2005. pp. 984-989.

Ke, et al., "Event Detection in Crowded Videos," in Proc. ICCV, 2007. pp. 1-8.

Gorelick, et al., "Actions as Space-Time Shapes," IEEE Trans PAMI, vol. 29, No. 12, 2007. pp. 1-8.

Wei, et al., "Dominant Sets-Based Action Recognition Using Image Sequence Matching," in Proc. ICIP, vol. VI, 2007. pp. 133-136.

Lv, et al., "Single View Human Action Recognition Using Key Pose Matching and Viterbi Path Searching," in Proc. CVPR'07, 2007. pp. 1-8.

Chen, et al., "Human Action Recognition Using 2-D Spatiotemporal Templates," in Proc ICME, 2007, pp. 667-670.

Kellokumpu, et al., "Human Activity Recognition Using Sequences of Postures," in Proc IAPR Conf. Machine Vision Applications, 2005. pp. 1-4.

Yamato, et al., "Recognizing Human Actions in Time-Sequential Images Using Hidden Markov Model," in Proc. CVPR92, 1992. pp. 379-385.

Bobick, et al., "The Recognition of Human Movement Using Temporal Templates," IEEE PAMI, vol. 23, 2001. pp. 257-267.

Davis, et al., "Minimal-Latency Human Action Recognition Using Reliable Inference," Image and Vision Computing, vol. 24, 2006. pp. 455-472.

Gavrila, "The Visual Analysis of Human Movement: A Survey," Computer Vision and Image Understanding, vol. 73, No. 1, 1999. pp. 82-98.

Hu, et al., "A Survey on Visual Surveillance of Object Motion and Behaviors," IEEE Trans. SMC-C, vol. 34, No. 3, 2004. pp. 334-351.

Moeslund, et al., "A Survey of Computer Vision-Based Human Motion Capture," Laboratory of Computer Vision and Media Technology, Aalborg University, 2001. pp. 1-73.

Hu, "Visual Pattern Recognition by Moment Invariants," IRE Trans. Information Theory, vol. 8, No. 2, 1962. pp. 179-187.

Meng, et al., "A Human Action Recognition System for Embedded Computer Vision Application," in Proc. CVPR, 2007. pp. 1-6.

Fujiyoshi, et al., "Real-time Human Motion Analysis by Image Skeletonization," in Proc. fourth IEEE Workshop on Applications of Computer Vision, 1998. pp. 113-120.

Blank, et al., "Actions as Space-time Shapes," in ICCV, 2005. pp. 1-8.

Wang, et al., "Learning and Matching of Dynamic Shape Manifolds for Human Action Recognition," IEEE Trans. Image Processing, vol. 16, 2007. pp. 1646-1661.

Wang, et al., "Unsupervised Discovery of Action Classes," in Proc. CVPR, vol. 2, 2006. pp. 1-8.

Belongie, et al., "Shape Matching and Object Recognition Using Shape Contexts," IEEE PAMI, vol. 24, No. 24, 2004. pp. 509-522.

Colombo, et al., "Compact Representation and Probabilistic Classification of Human Actions in Videos," in Proc. IEEE AVSS'07, 2007. pp. 1-5.

Veeraraghavan, et al., "Role of Shape and Kinematics in Human Movement Analysis," in Proc. CVPR'04, 2004. pp. 1-8.

Rabiner, "A Tutorial on Hidden Markov Models and Selected Applications in Speech Recognition," Proceedings of the IEEE, vol. 77, No. 2, 1989. pp. 257-286.

Green, et al., "Quantifying and Recognizing Human Movement Patterns From Monocular Video Images Part I: A New Framework for Modelling Human Motion," IEEE Trans. CSVT, vol. 14, No. 2, 2004. pp. 179-190.

Wilson, et al., "Recognition and Interpretation of Parametric Gesture," in ICCV98, 1998. pp. 329-336.

Brand, et al., "Discovery and Segmentation of Activities in Video," IEEE Trans. PAMI, vol. 22, No. 8, 2000. pp. 844-851.

Oliver, et al., "Layered Representations for Learning and Inferring Office Activity from Multiple Sensory Channels," Computer Vision and Image Understanding, vol. 96, 2004. pp. 163-180.

Sminchisescu, et al., "Conditional Models for Contextual Human Motion Recognition," in Proc ICCV, 2005. pp. 1-8.

Carlsson, et al., "Action Recognition by Shape Matching to Key Frames," in Workshop on Models versus Exemplars in Computer Vision, 2001. pp. 1-8.

Ahmad, et al., "Human Action Recognition Using Multi-view Image Sequences Features," in Proc 7'th Conf. on AFGR, 2006. pp. 1-6.

Pierobon, et al., "Clustering of Human Actions Using Invariant Body Shape Descriptor and Dynamic Time Warping," in Proc. IEEE AVSS, 2005. pp. 22-27.

Shi, et al., "Normalised Cuts and Image Segmentation," IEEE Trans. PAMI, vol. 22, No. 8, 2000. pp. 888-905.

Pavan, et al., "Dominant Sets and Pairwise Clustering," IEEE PAMI, vol. 29, No. 1, 2007. pp. 167-172.

Hathaway, et al., "NERF C-means: Non-euclidean Relational Fuzzy Clustering," Pattern Recognition, vol. 27, 1994. pp. 429-437.

Zheng, et al., "Simulation of Human Motion for Learning and Recognition," in LNAI 4304, Springer, A. Sattar and B. Kang, Eds., 2006. pp. 1168-1172.

Zheng, et al., "Human Motion Simulation and Action Corpus," in Proc of 1st International Conference on Digital Human Modeling, HCI International, 2007. pp. 314-322.

Hershey, et al., "Approximating the Kullback Leibler Divergence Between Gaussian Mixture Models," in Proc ICASSP, vol. IV, 2007. pp. 317-320.

Veeraraghavan, et al., "The Function Space of an Activity," in Proc CVPR'06, 2006. pp. 1-8.

Laptev, et al., "Space-time Interest Points," in Proc. ICCV, 2003. pp. 1-8.

\* cited by examiner

RECOGNIZING ACTIONS OF ANIMATE OBJECTS IN VIDEO

BACKGROUND

Popularity of video surveillance systems has increased over the last several years. Such popularity increase can be attributed, at least in part, to advancements in video technology, reduction in price of video cameras, as well as increase in video storage capacity. For instance, many consumer-level video cameras can generate relatively high resolution video data, and such cameras often are equipped with hard drives that can be used to retain several hours of video data. Furthermore, even if a video camera is not equipped with a hard drive, the video camera can be placed in communication with a data store (e.g., by way of a firewire cable) and video data can be directed to the data store for short-term or long-term storage. Thus, capturing video and storing video are relatively inexpensive.

Compensating a human being, however, to monitor video data captured by a surveillance camera remains costly. For instance, many retail stores have video surveillance cameras that transmit video to a control room that includes multiple display screens, such that video from different surveillance cameras are provided to different display screens. One or more human beings monitor the display screens in search of suspicious or illegal activity and dispatch a security officer to a particular location if suspicious or illegal activity is observed on one of the display screens. Use of a human, however, is expensive, as a retail store must compensate the human being that is monitoring the display screens. Furthermore, a brief lapse in concentration can result in misappropriation of valuable goods.

Accordingly, systems have been developed that can be used to analyze video data and automatically determine particular actions that are being undertaken by an individual in the video data. Such systems, however, are generally inefficient to operate and difficult to train.

SUMMARY

The following is a brief summary of subject matter that is described in greater detail herein. This summary is not intended to be limiting as to the scope of the claims.

Described herein are various technologies pertaining to automatic recognition of an action of an animate object in video data. For instance, the animate object may be a human, an animal, a projected object, and/or other suitable animate object. An action graph is used in connection with automatically recognizing actions. The action graph includes nodes that represent multiple posture models (states) that are representative of different portions of an action (e.g., a particular body position). Further, the action graph includes transitional probabilities that describe a probability that an animate object will transfer between postures for various actions. Pursuant to an example, the action graph can include postures that are shared between multiple actions that can be determined through use of the action graph.

With respect to determining an action, video data that includes a plurality of video frames can be received. In an example, the video frames may include silhouettes of the animate object. Postures of the animate object are recognized by comparing information derived from the video frames with posture models in the action graph. By analyzing transitional probabilities of the action graph, a most likely path of postures can be ascertained. Once the most likely path is determined, probabilities of the path corresponding to a particular action can be ascertained. If a probability of the path corresponding to an action is above a threshold, the action can be the determined action.

The action graph can be automatically learned based upon training data. More particularly, training data that includes multiple postures of various actions can be received, and clusters of postures can be generated. For instance, clustering postures can be based at least in part upon a determined amount of shape and motion dissimilarity between postures. Once the clusters are ascertained, transitional probabilities corresponding to the clusters can be learned for multiple actions.

Other aspects will be appreciated upon reading and understanding the attached figures and description.

DETAILED DESCRIPTION

Figure 1:
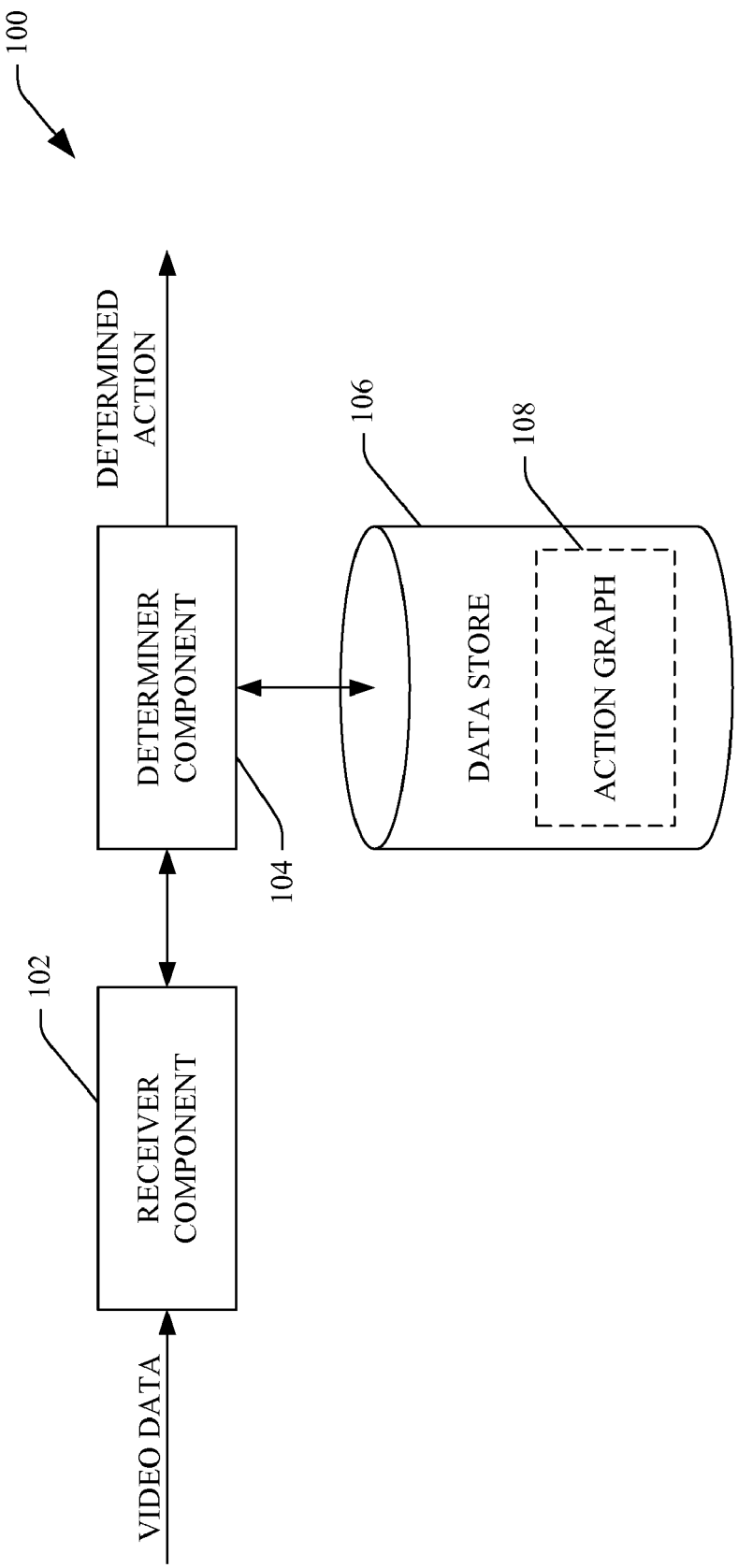
FIG. 1 is a functional block diagram of an example system that facilitates automatically recognizing an action of an animate object in video data.

Various technologies pertaining to action recognition in general, and automatic human action recognition in particular, will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference now to FIG. 1, an example system 100 that facilitates automatically determining an action of an animate object in received video data is illustrated. In an example, the animate object may be a human, an animal, a moving object (e.g., a thrown ball), or other suitable animate object. The system 100 may be retained in a video camera unit or may be in a separate computing device. The system 100 includes a receiver component 102 that receives video data, wherein the video data includes images of an animate object. For instance, the video data may be a video feed that is received in real-time from a video camera. In another example, the video data may be received from a data storage device. Furthermore, the video data may be received in any suitable video format, may be compressed or uncompressed, sampled or unsampled, etc. In a particular example, the video data may include a silhouette of a human that is undertaking a particular action, such as walking, running, jumping, sliding, etc.

The system 100 also includes a determiner component 104 that is in communication with the receiver component 102 and receives the video data. The determiner component 104 can automatically determine an action undertaken by the animate object in the received video data. More specifically, in response to receiving the video data, the determiner component 104 can detect one or more postures of the animate object in the video data. A posture may be a particular position of segments of the animate object, a particular position of joints of the animate object, a spatiotemporal position, etc. Further, the determiner component 104 can access a data store 106 that includes an action graph 108, wherein the action graph 108 comprises a plurality of nodes that are representative of multiple possible postures of the animate object. Moreover, at least one node in the action graph 108 can be shared amongst multiple actions. In addition, the action graph 108 can include edges that are representative of probabilities of transition between nodes (postures) for different actions.

In operation, the receiver component 102 can receive video data of an animate object. For instance, the animate object may be a human in the act of running. The video data can be received by the determiner component 104, and the determiner component 104 can detect multiple postures of the human (captured in the received video) in a sequence. The determiner component 104 can access the action graph 108 and compare the sequence of postures with sequences of postures of actions determinable through use of the action graph. Based at least in part upon the comparison, the determiner component 104 can output a determined action. For instance, the output action can be output to a data repository and stored therein, output to a display device, output to a printer, and/or the like.

The system 100 may be used in a variety of applications. For instance, the system 100 may be utilized in a security application, wherein the system 100 can detect suspicious activity of an individual. In a detailed example, the system 100 may be used in a retail establishment in connection with detecting shoplifting. In another example, the system 100 may be used in an airport to detect suspicious activity. In still yet another example, the system 100 may be used to detect actions of animals (e.g., in a zoo to determine whether an animal is beginning to become aggressive). Of course, it is to be understood that other applications are contemplated.

Figure 2:
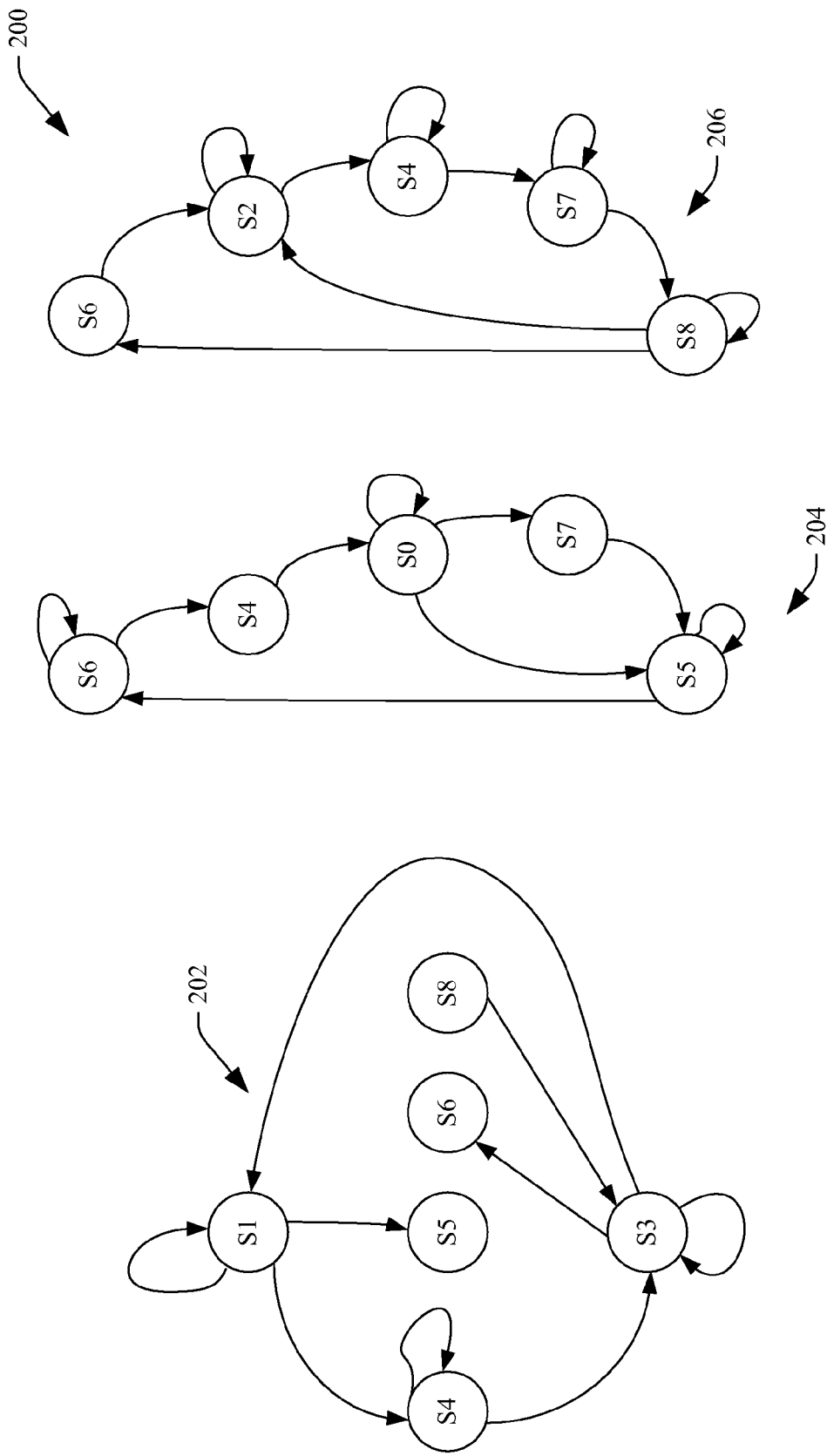
FIG. 2 is an example depiction of an action graph.

Now referring to FIG. 2, an example depiction of an action graph 200 is presented. The action graph 200 is shown for purposes of explanation as three separate graphs (a first graph 202 that corresponds to an action of running, a second graph 204 that corresponds to an action of walking, and a third graph 206 that corresponds to an action of sliding). Further, it can be noted that the graphs 202, 204, and 206 share postures. Accordingly, the three graphs may be represented as a single graph that can be used to determine multiple actions in video data, wherein the determination of an action can be based at least in part upon postures that are shared between actions that are determinable by way of the graph 200.

In action graphs in general, each action can be encoded in one or multiple paths between postures. In the example graph 200, the three actions of running, walking, and sliding share nine postures (e.g., states in a state model). It can be discerned that one of the actions may undergo a subset of all postures corresponding to the action. For instance, a human that undertakes the action of running may go through postures S1, S4, S3 and S6 (but not S5 and S8, which are also postures that correspond to running). Similarly, a human that undertakes the action of walking may go through postures S6, S4, S0, S7 and S5. In another example, a human that undertakes the action of sliding may go through postures S6, S2, S4, S7, and S8. It can thus be discerned that the three example actions of running, walking, and sliding that can be determined through use of the action graph 200 can share postures, and each action can have numerous paths in the action graph. In addition, action paths in the graph 200 may be cyclic, and therefore there may be no specific beginning and ending postures for the action from the recognition point of view.

Links between postures represented in the action graph 200 can have corresponding probabilities that, for a particular action, an animate object will transition from one posture to another. Thus, for example, there may be a particular probability that human will transition from posture S1 to posture S4 when the human is running. Therefore, when the determiner component 104 (FIG. 1) detects a sequence of postures, the determiner component 104 can analyze the action graph 200 and determine a most-likely action based upon the detected postures and the probabilities and postures of the action graph 200.

The following is a mathematical description of action graphs, wherein silhouettes are employed to obtain postures of an animate object in video data, and wherein the action graph is based at least in part upon postures learned from silhouettes. It is to be understood, however, that other forms of animate objects may be used in connection with detecting postures and/or learning postures. For instance, rather than using silhouettes, full-color images in video data may be used to detect postures or learn postures. In another example, gray-scale images in video data may be used to detect postures and/or learn postures.

In an example, $X=\{x_1, x_2, \ldots, x_n\}$ can be a sequence of n silhouettes, $\Omega=\{\omega_1, \omega_2, \ldots \omega_M\}$ can be a set of M salient postures that constitute actions that are desirably determined by way of the action graph 200. A corresponding posture sequence derived from X can be denoted as $S=\{s_1, s_2, \ldots, s_n\}$, where $s_t \in \Omega$, $t=1, 2, \ldots, n$. Furthermore, $\Psi=\{\psi_1, \psi_2, \ldots, \psi_L\}$ can denote a set of L actions, and X can be generated from one of the L actions. A most likely action that can generate the observation of X can be formatted as:

$$\psi^* = \arg\max_{\psi\in\Psi, S\subset\Omega} p(X, S, \psi) \quad (1)$$

$$\propto \arg\max_{\psi\in\Psi, S\subset\Omega} p(\psi)p(S|\psi)p(X|S,\psi)$$

$$= \arg\max_{\psi\in\Psi, S\subset\Omega} p(\psi)p(s_1, \ldots, s_n|\psi)$$

$$p(x_1, \ldots, x_n|s_1, \ldots, s_n, \psi),$$

where $p(\psi)$ is a prior probability of action $\psi$, $p(S|\psi)$ is a probability of S given action $\psi$, and $p(X|S,\psi)$ is a probability of X given S and $\psi$.

Further, it can be assumed that i) $x_t$ is statistically independent of $\psi$ given S; ii) $x_t$ statistically depends only on $s_t$; and iii) $s_t$ is independent of the future states and only depends on its previous state $s_{t-1}$. Accordingly, equation (1) can be written as:

$$\psi^* = \arg\max_{\psi\in\Psi, S\subset\Omega} p(\psi)p(s_1, s_2, \ldots, s_n|\psi)\prod_{t=1}^{n} p(x_t|s_t), \quad (2)$$

where $p(x_t|s_t)$ is a probability for $x_t$ to be generated from salient posture (e.g., state) $s_t$. Further, it can be assumed that the set of postures can be known from or computed from training data, and the first term of equation (2) can be a Markov Model with known states, a Visible Markov Model, or other suitable model.

Thus, equation (2) can be represented as a set of weighted directed graphs, G that can be built upon the set of postures $$G=\{\Omega,A,A_1,A_2,\ldots,A_L\} \quad (3)$$

where each posture can serve as a node, $A_k=\{p(\omega_j|\omega_i,\psi_k)\}_{i,j=1:M}^{k=1:L}$ can be a transitional probability matrix of the kth action and $A=\{p(\omega_j|\omega_i)\}_{i,j=1}^{M}$ can be a global transitional probability matrix of all actions that can be determined through use of the action graph 200. Thus, G can be an action graph (such as the action graph 200).

With the graphical interpretation (e.g., the action graph 200 or other suitable action graph), a system that follows equation (2) can be described by a quadruplet, $$\Gamma=(\Omega,\Lambda,G,\Psi) \quad (4)$$

where $$\Omega=\{\omega_1,\omega_2,\ldots,\omega_M\} \quad (5)$$

$$\Lambda=\{p(x|\omega_1),p(x|\omega_2),\ldots,p(x|\omega_M)\}$$

$$G=(\Omega,A,A_1,A_2,\ldots,A_L)$$

$$\Psi=(\psi_1,\psi_2,\ldots,\psi_L).$$

Figure 3:
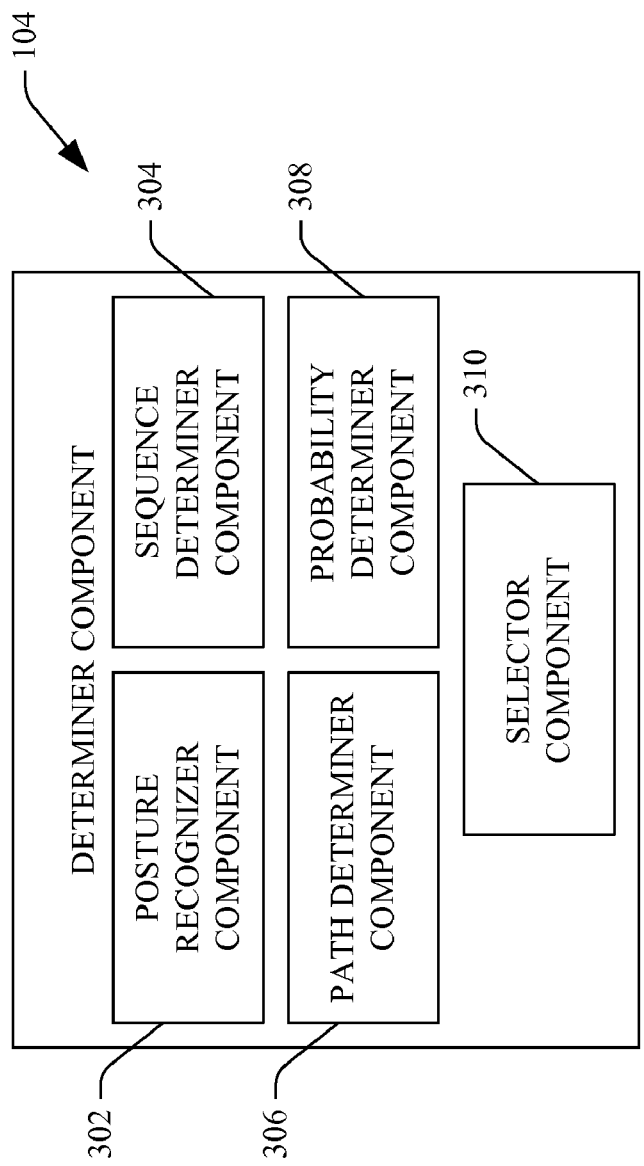
FIG. 3 is an example depiction of a component that can be used in connection with recognizing an action of an animate object in video data.

Turning now to FIG. 3, an example depiction of the determiner component 104 is illustrated. The determiner component 104 is illustrated as comprising several components. It is to be understood, however, that the determiner component 104 may include more or fewer components, that functionality described as being undertaken by components may be combined or split into multiple components, and that some components may reside outside the determiner component 104 (e.g., as a separate function).

As illustrated, the determiner component 104 includes a posture recognizer component 302 that can recognize a plurality of salient postures of an animate object in received video data. Pursuant to an example, the posture recognizer component 302 can receive video data that includes a silhouette of the animate object and can extract features from the silhouette that are indicative of a particular salient posture. For instance, the determiner component 104 can normalize a silhouette and obtain resampled points of a resulting contour (e.g., a shape descriptor). Further, a center of gravity may be located in the contour such to facilitate detecting motion in the silhouette (e.g., a motion vector). The posture recognizer component 302 can compare the shape descriptor and motion vector with learned postures and determine the posture of the animate object. For instance, the recognizer component 302 can determine the posture with a particular probability, wherein if the probability is above a threshold it can be determined that the animate object is at a particular posture. If the highest probability is below a threshold, it may be determined that the posture is not a learned posture.

The determiner component 104 may also include a sequence determiner component 304 that determines a sequence of observed postures. For instance, the sequence determiner component 304 can receive multiple postures determined by the posture recognizer component 302 and place a subset of the postures in a sequence (in accordance with time). For example, the sequence may relate to transition from one recognized posture to another. In another example, the animate object may be a human, and the human may be undertaking the action of walking. The posture recognizer component 302 can recognize numerous postures of the human while the human is walking, and the sequence determiner component 304 can receive such postures. The human, however, may walk at a slower pace than most other humans, and therefore some recognized postures may be redundant. The sequence determiner component 304 can take into consideration variations such as the above when placing postures in a sequence.

The determiner component 104 may also include a path determiner component 306 that can determine a most likely path in the action graph 108 (FIG. 1) that corresponds to the determined sequence. Continuing with the example described with respect to FIG. 2, an action of a sequence $X=\{x_1,x_2,\ldots,x_n\}$ can be received by the path determiner component 306. The path determiner component 306 can then locate a most probable path in an action graph G that generates X. In an example, the posture recognizer component 302 can determine postures with a particular probability. For instance, the posture recognizer component 302 can determine that, with thirty percent certainty, the posture corresponds to a first learned posture, and that, with twenty percent certainty, the posture corresponds to a second learned posture. The action graph can include transitional probabilities between certain postures. Given such probabilities, the path determiner component 306 can locate a most likely path in the action graph that generates X.

The determiner component 104 may also include a probability determiner component 308 that can determine a likelihood of each action $\psi_i$ given X, where $\psi_i\in\Psi$. Further, the determiner component 104 can include a selector component 310 that selects an action that has a highest likelihood as the action that corresponds to the received video data (the sequence X). In an example, the selector component 310 may only select an action if the probability determined by the probability determiner component 308 is above a threshold.

Pursuant to an example, the probability determiner component 308 can search for an Action Specific Viterbi Decoding (ASVD) in the action graph and can compute the likelihood for an action as follows:

$$L(\psi_i)=\max_{\psi_i\in\Psi, s\in\Omega} p(\psi_i)\prod_{t=1}^{n} p(s_t|s_{t-1},\psi_i)\prod_{t=1}^{n} p(x_t|s_t), \quad (6)$$

where $L(\psi_i)$ is the likelihood of X belonging to action $\psi_i$. The selector component 310 can select $\psi_k$ as the action corresponding to X if the following condition is met:

$$k = \arg\max_i L(\psi_i) \text{ if } \frac{L(\psi_k)}{\sum_{i=1}^{L} L(\psi_i)} > TH_l \qquad (7)$$

where $TH_l$ is a threshold that can be manually set or can be learned.

In another example, the probability determiner component 308 can search the action graph for a Viterbi path with respect to the global transitional probability (described above) and determine likelihoods for each action supported in the action graph. This can be referred to as Global Viterbi Decoding (GVD).

In GVD, the most likely path is the path $s^* = \{s^*_1, s^*_2, \ldots, s^*_n\}$ that satisfies $$s^* = \arg\max_{s_t \in \Omega} \Pi_{t=1}^n p(s_t|s_{t-1}) p(x_t|s_t). \qquad (8)$$

The probability determiner component 308 can determine an action that generates $s^*$, for example, through use of a unigram or bi-gram model, such as the following:

$$L(\psi_i) = \arg\max_{\psi_j \in \Psi} p(\psi_i) \Pi_{t=1}^n p(s^*_t|\psi_i) \text{ (unigram)} \qquad (9)$$

$$L(\psi_i) = \arg\max_{\psi_j \in \Psi} p(\psi_i) \Pi_{t=1}^n p(s^*_t|s^*_{t-1}, \psi_i) \text{ (bi-gram)} \qquad (10)$$

In yet another example, the probability determiner component 308 can use Maximum Likelihood Decoding (MLD) in connection with determining likelihoods with respect to different actions. More particularly, the probability determiner component 308 can search for a sequence of most likely postures in the action graph rather than a most likely sequence of postures (Viterbi path), e.g., $$s^* = \arg\max_{ss_t \in \Omega} \Pi_{t=1}^n = p(x_t|s_t). \qquad (11)$$

The probability determiner component 308 can use equation (9), equation (10), or other suitable algorithm to determine the likelihood of an action to generate the path $s^*$. As noted above, the selector component 310 may select a most likely action after the probability determiner component 308 has determined likelihoods that the sequence X corresponds to one or more actions.

From the above it can be discerned that the determiner component 104 can include components that can decode an action using any of a variety of algorithms, including ASVD, Unigram with Global Viterbi Decoding (UGVD), Bi-gram with Global Viterbi Decoding (BGVD), Uni-gram with Maximum Likelihood Decoding (UMLD), and/or Bi-gram with Maximum Likelihood Decoding (BMLD).

Figure 4:
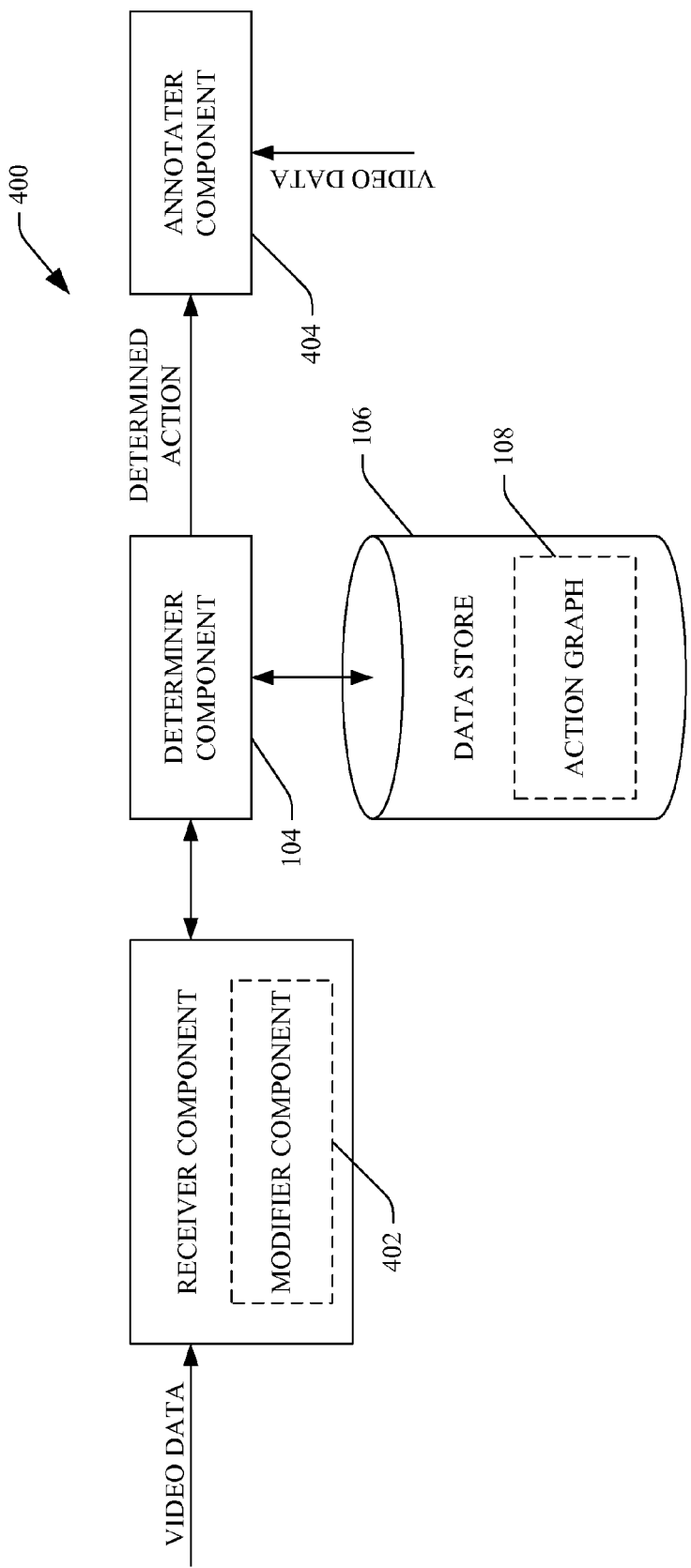
FIG. 4 is a functional block diagram of an example system that facilitates annotating video based at least in part upon a recognized action of an animate object in video data.

With reference now to FIG. 4, an example system 400 that facilitates annotating video in accordance with a recognized action in the video is illustrated. The system 400 includes the receiver component 102 that receives video data. The receiver component 102 may include a modifier component 402 that can modify the video to place the video in a format suitable for processing by the determiner component 104. For instance, the video data may include video of a first resolution, while the determiner component 104 is configured to process video data of a second resolution. The modifier component 402 can alter the resolution from the first resolution to the second resolution. In another example, the determiner component 104 may be configured to process silhouettes of animate objects (e.g., humans), and the received video data may be full-color video. The modifier component 402 can extract silhouettes from the video data, sample the silhouettes to create a contour, orient the silhouette at a desired orientation. Other modifications are also contemplated and intended to fall within the scope of the hereto-appended claims.

The determiner component 104 can receive the video data in a format suitable for processing and, as described above, can determine an action being undertaken by the animate object in the video data. More particularly, the determiner component 104 can access the action graph 108 and can decode an action corresponding to at least a portion of the video data through analysis of the action graph.

The system 400 may also include an annotater component 404 that can annotate portions of the video data with information pertaining to an action that is determined to correspond to the portions of the video data. For instance, the system 400 may be used in a security context, and a suspicious action can be detected by the determiner component 104. The annotater component 404 can annotate video provided to a security officer to highlight that an individual in the video is acting in a suspicious manner. Annotation undertaken by the annotater component 404 may include audio annotation (e.g., an audio alarm), annotating the video with text or graphics, etc.

Figure 5:
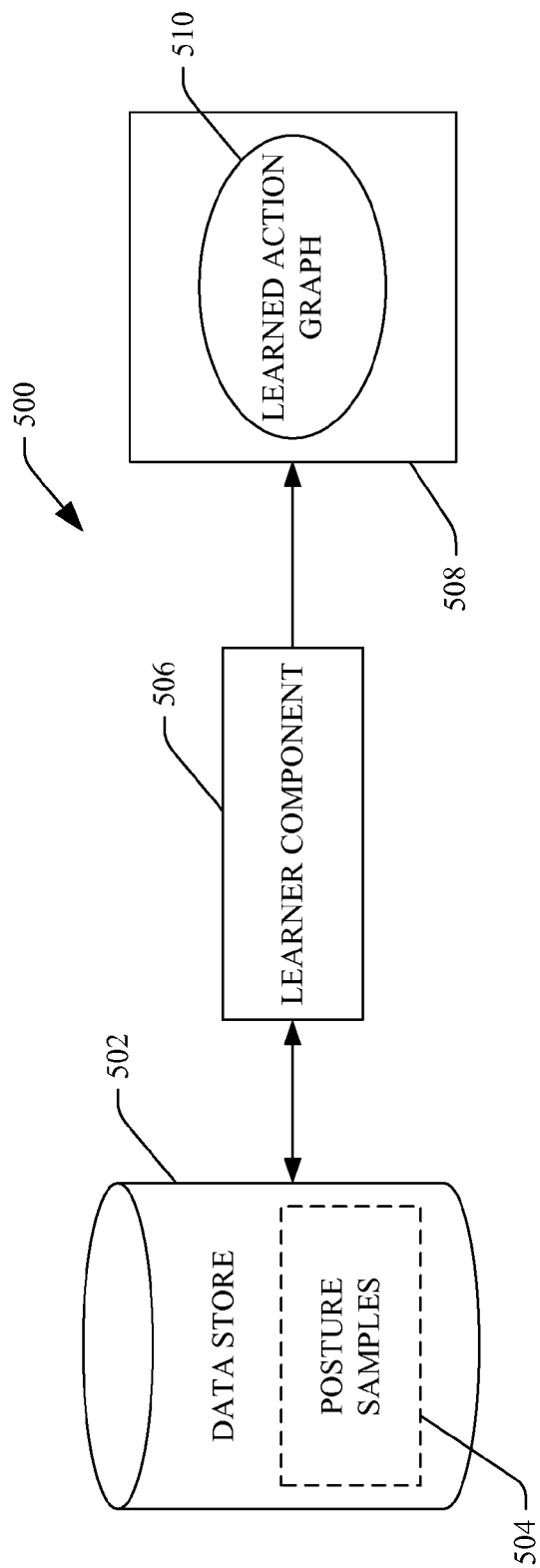
FIG. 5 is a functional block diagram of an example system that facilitates automatically learning an action graph.

With reference now to FIG. 5, a system 500 that facilitates learning a system that includes an action graph is illustrated, wherein the system can be used to determine actions of an animate object in video. The system 500 includes a data store 502 that includes a plurality of posture samples 504. The posture samples 504 can, for instance, be derived from kinematics and kinetics of animate object motion and/or automatically learned given sufficient training data. For instance, if silhouettes are used as training data, silhouettes may be clustered into M clusters.

The system 500 additionally includes a learner component 506 that can receive the posture samples 504 and, based at least in part upon the posture samples (which take into consideration temporal information), the learner component 506 can learn a system 508 (e.g., the system F) that includes a learned action graph 510. The system 508 may be used to determine motion of an animate object in a received video. As noted above, a posture can represent a set of similar poses of an animate object, such as a human. The learner component 508 can take into consideration the temporal nature of animate object motion (such as human motion), the similarity between poses can measured, wherein such measurement may take into account segment and/or joint shape as well as motion.

Figure 6:
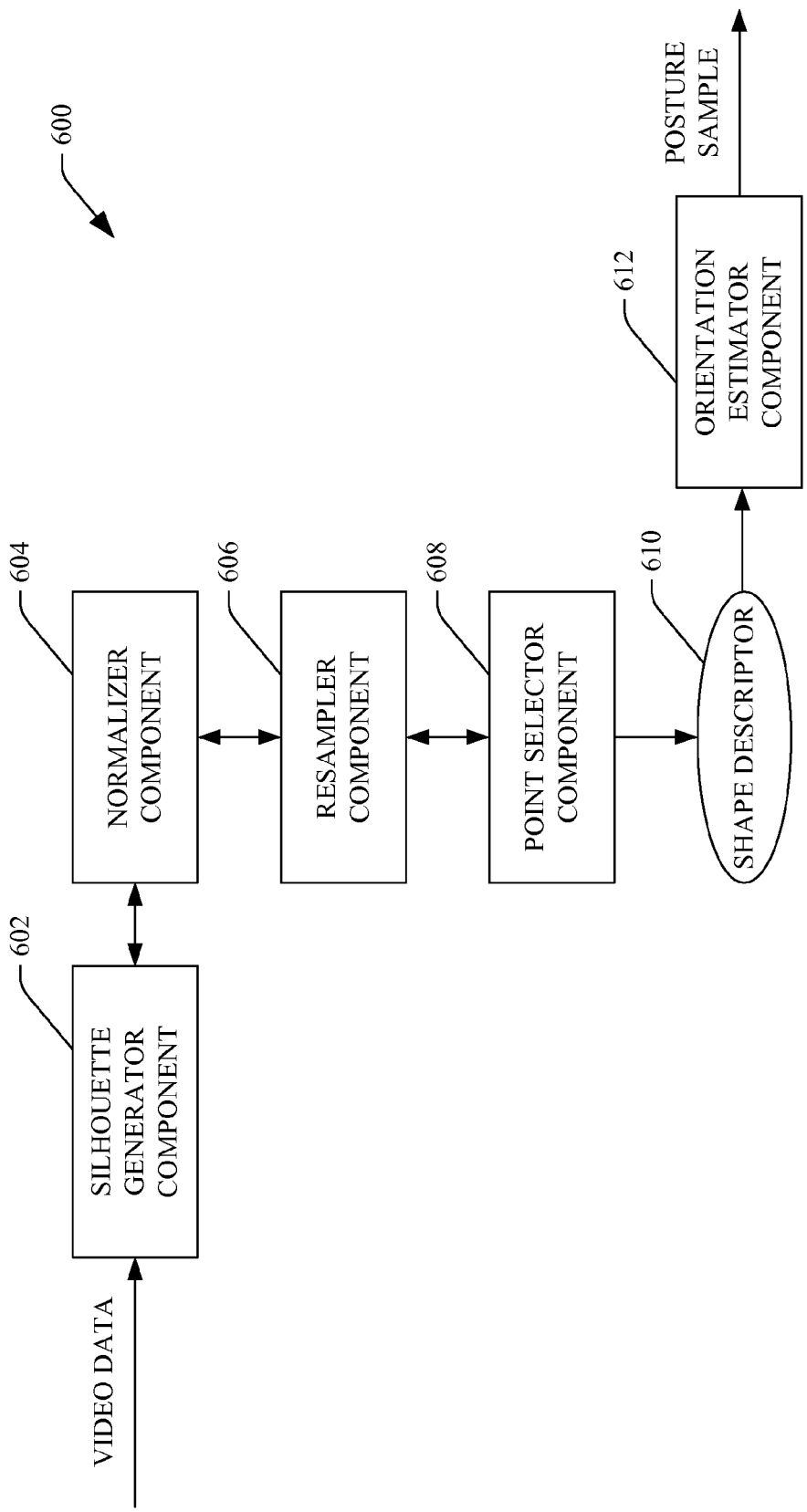
FIG. 6 is a functional block diagram of an example system that facilitates preparing data for use in connection with learning an action graph.

With reference now to FIG. 6, an example system 600 that facilitates obtaining posture samples is illustrated. The system 600 includes a silhouette generator component 602 that receives video data, wherein the video data includes images of at least one animate object. The silhouette generator component 602 can receive the video data and automatically generate silhouette images of the at least one animate object in the video data.

The system 600 can additionally include a normalizer component 604 that can perform a scale normalization on received silhouettes. Such scale normalization undertaken by the normalize component 604 can account for changes in body size, for instance.

A resampler component 606 may also be included in the system 600. The resampler component 606 can resample the normalized silhouette to create multiple points along a silhouette contour. A point selector component 608 can then select a relatively small number of points along the contour to create a shape descriptor 610 (e.g., a set of points that describes the shape of the contour). The point selector component 608 may select points based at least in part upon noise and computational efficiency.

The system 600 can also include an orientation estimator component 612 that can detect a change in orientation of the animate object and local motion of a gravity center of the animate object. In an example, if the shape descriptor describes a human, motion of the human include a change of orientation of the human body and local motion of gravity center of the human body. The orientation estimator component 612 can estimate the change in motion of the human body by fitting an ellipse into the resampled silhouette shape. The estimated change in motion can be used by the learner component 506 (FIG. 5) to learn the system 508 and the action graph 510.

Figure 7:
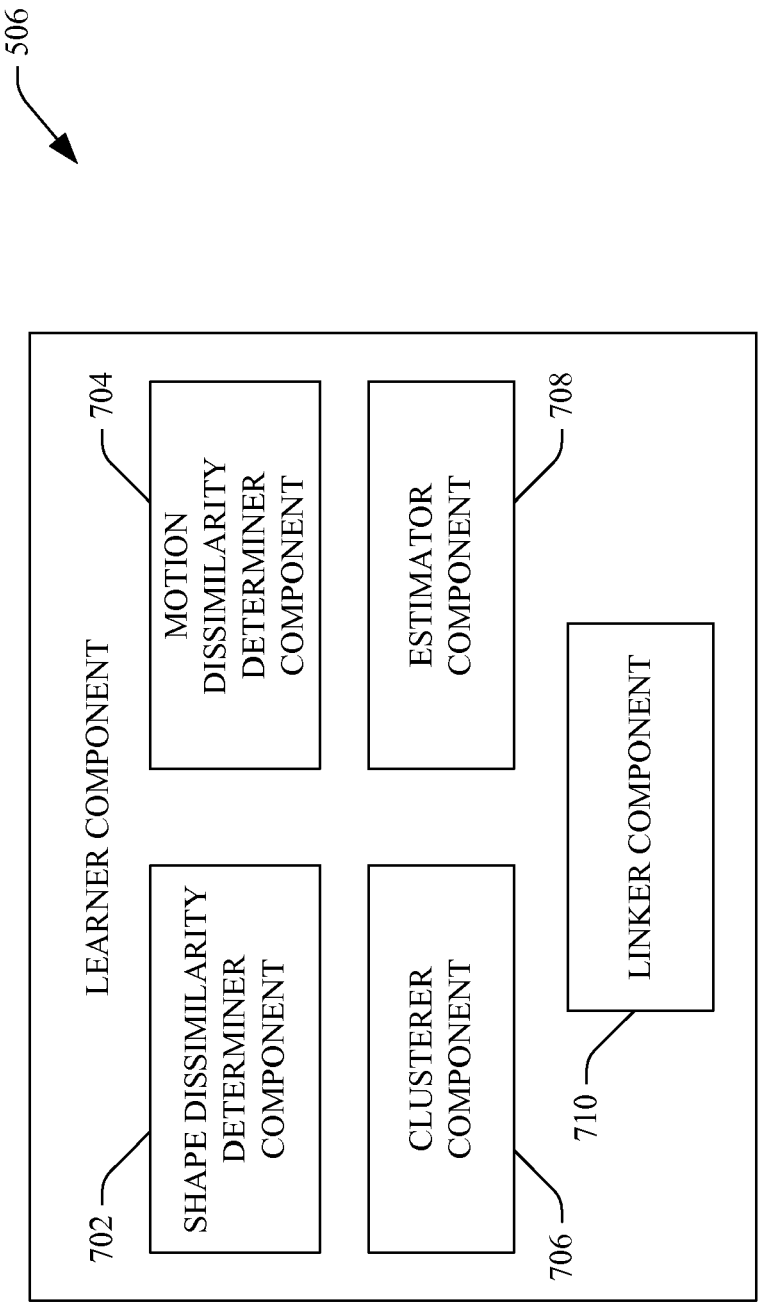
FIG. 7 is an example depiction of a component that can be used to learn an action graph.

Now referring to FIG. 7, an example depiction of the learner component 506 is depicted. The learner component 506 may include a shape dissimilarity determiner component 702 that determines dissimilarity between different shape descriptors. As described above, the contour of a silhouette can be normalized and resampled to a relatively small number of points. For instance, it can be assumed that $f_{sp}=\{x_1, x_2, \ldots, x_b\}$ and $f'_{sp}=\{x'_1, x'_2, \ldots, x'_b\}$ are two shapes that are described by a set of b points (e.g., points selected by the point selector component 608). Dissimilarity of the two shapes can be defined as:

$$d_{sp} = \frac{1}{1 + e^{-a(d_h(f_{sp}, f'_{sp})-c)}}, \quad (12)$$

where $d_h(X, Y)$ is a Hausdorff distance between X and Y; a and c are two constants.

The learner component 506 can additionally include a motion dissimilarity determiner component 704 that determines motion dissimilarity between motion feature vectors of silhouettes. As noted above, motion features can include a change of orientation of an animate object and local motion of its gravity center. The orientation of the animate object can be estimated by fitting an ellipse into a silhouette shape. It can be assumed that $f_m=(\delta x, \delta y, \delta \theta)$ and $f'_m=(\delta x', \delta y', \delta \theta')$ are motion vectors of silhouettes x and x', respectively. The dissimilarity of x and x' in terms of motion can be defined as follows:

$$d_{mt} = \frac{1}{1 + e^{-a(corr(f_m, f'_m)-c)}}, \quad (13)$$

where corr(.,.) represents correlation

The learner component 506 can also include a clusterer component 706 that can cluster silhouettes based at least in part upon the aforementioned dissimilarities. More specifically, dissimilarity of two silhouettes can be defined as a product of motion and shape dissimilarity:

$$d=d_{sp}*d_{mt}. \quad (14)$$

Values of dissimilarity may be placed in a form suitable for processing, such as in a matrix. For instance, $D=[d_{ij}]_{i,j=1}^J$ can be a dissimilarity matrix of all pairs of J training silhouettes, where D is a J×J symmetric matrix. The clusterer component 706 can use any suitable clustering algorithm to cluster the J silhouettes into M clusters. For instance, the clusterer component 606 may use Normalized Cuts (NCuts), Dominant Sets (DS), Non-Euclidean Relational Fuzzy (NERF) C-Means, and/or other suitable clustering algorithm in connection with clustering silhouettes.

The learner component 506 may further include an estimator component 708 that estimates salient postures that can be used in an action graph. For instance, after clustering, the estimator component 708 can fit a Gaussian Mixture Model (GMM) using a suitable expectation and maximization (EM) algorithm to the shape component of a cluster to represent spatial distribution of contours of silhouettes belonging to a particular posture cluster. The estimator component 708 can fit another Gaussian to the motion component of the cluster to obtain a compact representation of a model of a posture. This can be represented as follows:

$$p_{sp}(y_{sp}|s) = \sum_{k=1}^{C} \pi_{k,s} N(y_{sp}; \mu_{k,s}; \Sigma_{k,s}) \quad (15)$$

$$p_{mt}(y_{mt}|s) = N(y_{mt}; \mu_{mt,s}; \Sigma_{mt,s}) \quad (16)$$

where $p_{sp}(y_{sp}|s)$ is a GMM with C components for shape and $p_{mt}(y_{mt}|s)$ is a Gaussian for motion, and where s represents s salient postures/states (or clusters of silhouettes), N(.) is a Gaussian function, $y_{mt}$ represents the motion feature vector; $\mu_{mt,s}$ is a mean motion vector for salient posture s, $\Sigma_{mt,s}$ is a 3×3 matrix denoting covariance of the motion features, $y_{sp}$ represents 2D coordinates of a point on the contours of silhouettes, $\mu_{k,s}$ is the center of the kth Gaussian for posture S, $\Sigma_{k,s}$ is a 2×2 covariance matrix, $\pi_{k,s}$ is a mixture proportion such that $\Sigma_{k=1}^{C} \pi_{k,s}=1$. Accordingly, an estimated model for a posture that can be used in an action graph (e.g., a posture model) can be defined as:

$$p(x|s)=p_{mt}(y_{mt}|s)\Pi_{i=1}^{b} p_{sp}(y_{sp}^i|s) \quad (17)$$

where x is a silhouette, $y_{mt}$ and $y_{sp}^i$ represent respectively the motion feature and the ith point on the resampled contour of x.

The learner component 506 can also include a linker component 710 that can link learned postures (posture models) with transitional probabilities. For example, the linker component 710 can estimate action-specific and global-transitional probability matrices $\{A_{ij}\}_{i=1}^{L}$ and A from training samples given statistical independence assumptions described above. The action-specific and global transitional probabilities can be defined as follows:

$$p(\omega_i|\omega_j) = \frac{\sum_{t=1}^{J} p(\omega_i|x_t)p(\omega_j|x_{t-1})}{\sum_{t=1}^{J} p(\omega_i|x_t)} \quad (18)$$

$$p(\omega_i|\omega_j, \psi_l) = \frac{\sum_{t=1}^{J_l} p(\omega_i|x_t, \psi_l)p(\omega_j|x_{t-1}, \psi_l)}{\sum_{t=1}^{J_l} p(\omega_i|x_t, \psi_l)} \quad (19)$$

where J is a total number of training silhouettes for all actions and $J_l$ is a number of silhouettes contained in training samples for the action $\psi_l$. $p(\omega_i)$ and $p(\omega_i|\psi_l)$ can be obtained through marginalization of $p(\omega_i|\omega_j)$ and $p(\omega_i|\omega_j, \psi_l)$ respectively.

Figure 8:
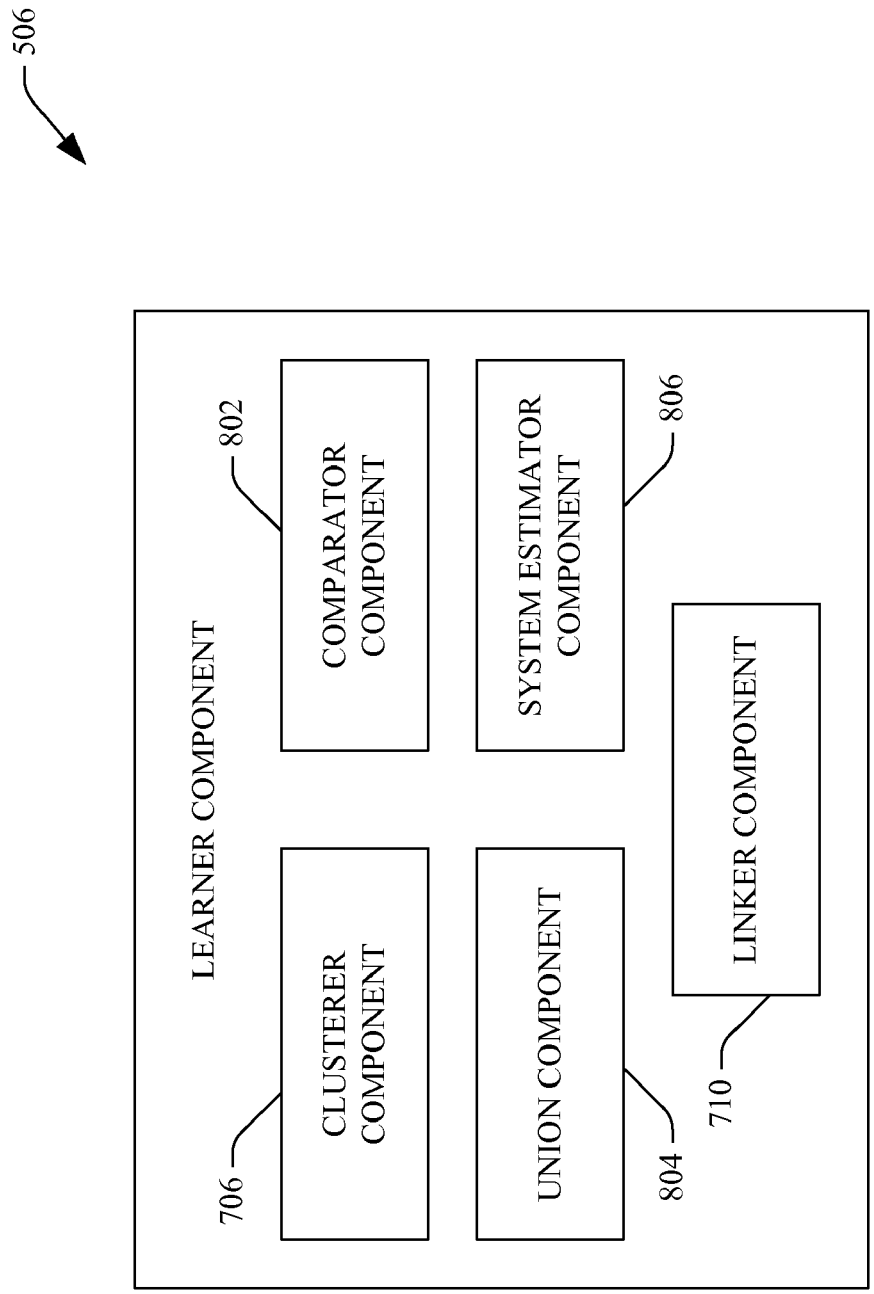
FIG. 8 is an example depiction of a component that can be used to learn a new action in an existing action graph.

Now referring to FIG. 8, another example depiction of the learner component 506 is illustrated. In this example depiction, the learner component 506 can extend an existing system to recognize a new action. For instance, $\Gamma=\{\Omega, G, \Lambda, \Psi\}$ can be a system that has been trained to recognize L actions of an animate object. It may be desirable to add a new action $\psi_{L+1}$ to the system $\Gamma$. In an example, the new action $\psi_{L+1}$ may have K training sequences of silhouettes, $\{y_t^k\}_{t=1:T_k}^{k=1:K}$, where $T_k$ is a number of frames in the kth training sequence. When a new action is included in the system, both the action graph and posture models may desirably be updated. The learner component 506 can limit the addition of the new action to insertion of new postures that describe $\psi_{L+1}$ into the action graph, modification of A, and insertion of $A_{L+1}$.

In general, two cases can be considered: 1) $\Omega$ includes all postures that are required to describe the action $\psi_{L+1}$. In this case, postures can be shared and new paths can be inserted into the action graph by updating A and $A_{L+1}$. 2) $\Omega$ does not include all postures that are required to describe the action $\psi_{L+1}$. In this instance, new postures can be created for $\psi_{L+1}$ and the action graph can be expanded by updating A and $A_{L+1}$.

Thus, it can be discerned that it may be desirable to determine whether new postures are desired and how to create any new postures. An example approach is to locate salient postures for a new action first and thereafter to decide whether such postures have already been learned by the learning component 506 by comparing the located postures to those residing in the existing action graph.

To that end, the learning component 506 can include the clusterer component 706 that clusters silhouettes pertaining to the new action into m postures $\Omega'=\{\omega'_1,\omega'_2,\ldots,\omega'_m\}$, whose prototypes are $\Lambda'=\{p'(x|\omega'_1),p'(x|\omega'_2),\ldots,p'(x|\omega'_m)\}$. The clusterer component 706 can operate as described above to generate clusters of silhouettes (or other training samples).

The learner component 506 can also include a comparator component 802 that compares each new posture $\omega'_i$, i=1 ..., m with each existing posture in $\Omega$. If the comparator component 802 determines that $\omega'_i$ is similar to a posture existent in $\Omega$, then the comparator component can discard $\omega'_i$. If the comparator component 802 determines that $\omega'_i$ is not similar to a posture existent in $\Omega$, then the comparator component 802 can cause $\omega'_i$ to be retained in $\Omega'$.

Similarity can be determined in any suitable manner. In an example, since postures can be modeled by a single Gaussian for motion and a GMM for shape, similarity between two postures can be measured by Kullback-Leibler (KL) divergence. KL divergence for motion between postures s and s' can be defined as follows:

$$KL_{mt}(p_{mt} \| p'_{mt}) = D(N(y_{mt}; \mu_{mt}; \Sigma_{mt}) \| N(y_{mt}; \mu'_{mt}; \Sigma'_{mt}))$$
$$= \frac{1}{2}\left[\log\frac{\det(\Sigma'_{mt})}{\det(\Sigma_{mt})} + tr(\Sigma_{mt}^{-1}\Sigma'_{mt}) - d + (\mu_{mt} - \mu'_{mt})^T \Sigma_{mt}^{-1}(\mu_{mt} - \mu'_{mt})\right],$$

where KL(p∥p') represents a KL-divergence between distribution p and p'; D(N∥N') is the KL-divergence between two Gaussians, N and N'.

KL-divergence for shape between postures s and s' can be defined as follows:

$$KL_{sp}(p_{sp} \| p'_{sp}) = \Sigma_a \pi_a \log\frac{\Sigma_{a'}\pi_{a'}e^{-D(N_a\|N_{a'})}}{\Sigma_b \pi_b e^{-D(N_a\|N_b)}}. \quad (20)$$

In an example, s' may be deemed similar to s if the following condition is met:

$(KL_{mt} - \overline{KL}_{mt}) < \alpha_{sp} * \sigma_{KL_{mt}}$ or $(KL_{sp} - \overline{KL}_{sp}) < \alpha_{mt} * \sigma_{KL_{sp}}$, where $\overline{KL}_{mt}$, $\sigma_{KL_{mt}}$, $\overline{KL}_{sp}$, and $\sigma_{KL_{sp}}$ are the mean and standard deviation of the KL-divergences of all pairs of postures in the system $\Gamma$ before updating, $\alpha_{sp}\epsilon(0,1]$ and $\alpha_{mt}\epsilon(0,1]$ are constants.

The learner component 506 can further include a union component 804 that merges $\Omega$ and $\Omega'$. More particularly, the union component can create $\Omega^{new}$ as the union of $\Omega$ and $\Omega'$, such that $\Lambda^{new}$ is the posture models (learned postures) of $\Omega^{new}$.

The learner component 506 additionally includes a system estimator component 806 that estimates the transitional probabilities $A_{L+1}$ and A' from the K training samples for $\psi_{L+1}$ based at least in part upon $\Lambda^{new}$. The system estimator component 806 can update A as follows:

$$A^{new}=A+\beta*A', \quad (21)$$

where $\beta\epsilon(0,1)$ is a weighting factor controlling the contribution of new action samples to the global transition. Since the number of training samples K may be relatively small compared to a number of samples used to train A, A' is often much less reliable than A. Accordingly, the system estimator component 806 can limit the contribution of A' to final global transitional probabilities by the factor $\beta$, which can be selected to reflect the ratio of the size of the new training samples to the size of the samples used to estimate A.

In some instances, training samples for a new action may only capture a relatively small proportion of possible posture transitions that correspond to the new action. Accordingly, $A_{L+1}$ may not be a reliable estimation of a true transition. The system estimator component 806 may employ a smoothing technique to facilitate compensating for a relatively small number of samples. In an example, the following linear model may be used to smooth $A_{L+1}$:

$$p(s_i | s_j, \psi_{L+1}) = \qquad (22)$$
$$\left(1 - e^{-p(s_j,s_i,\psi_{L+1})}\right)\frac{p(s_j, s_i, \psi_{L+1})}{p(s_j, \psi_{L+1})} + e^{-p(s_i,s_j,\psi_{L+1})}p(s_i, \psi_{L+1}),$$

where $s_i, s_j \epsilon \Omega^{new}$ and $p(s_j,s_i,\psi_{L+1})$ is a joint probability of a frame being in posture $s_j$ followed by another frame being in posture $s_i$. Equation (22) can be interpreted as an interpolation of bi-gram and uni-gram transitional probabilities. For unseen events, the transitional probability can be set to be the uni-gram probability of the second posture of the bi-gram. If the estimator component 806 provides too much weight to the uni-gram probability, faulty estimation may result if $s_i$ is very frequent. Therefore, the estimator component 806 may decrease the value of the weight exponentially with a number of bi-gram observations.

The learner component 506 can also include the linker component 710, which can link learned postures (posture models) with transitional probabilities as described above.

With reference now to FIGS. 9-13, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Figure 9:
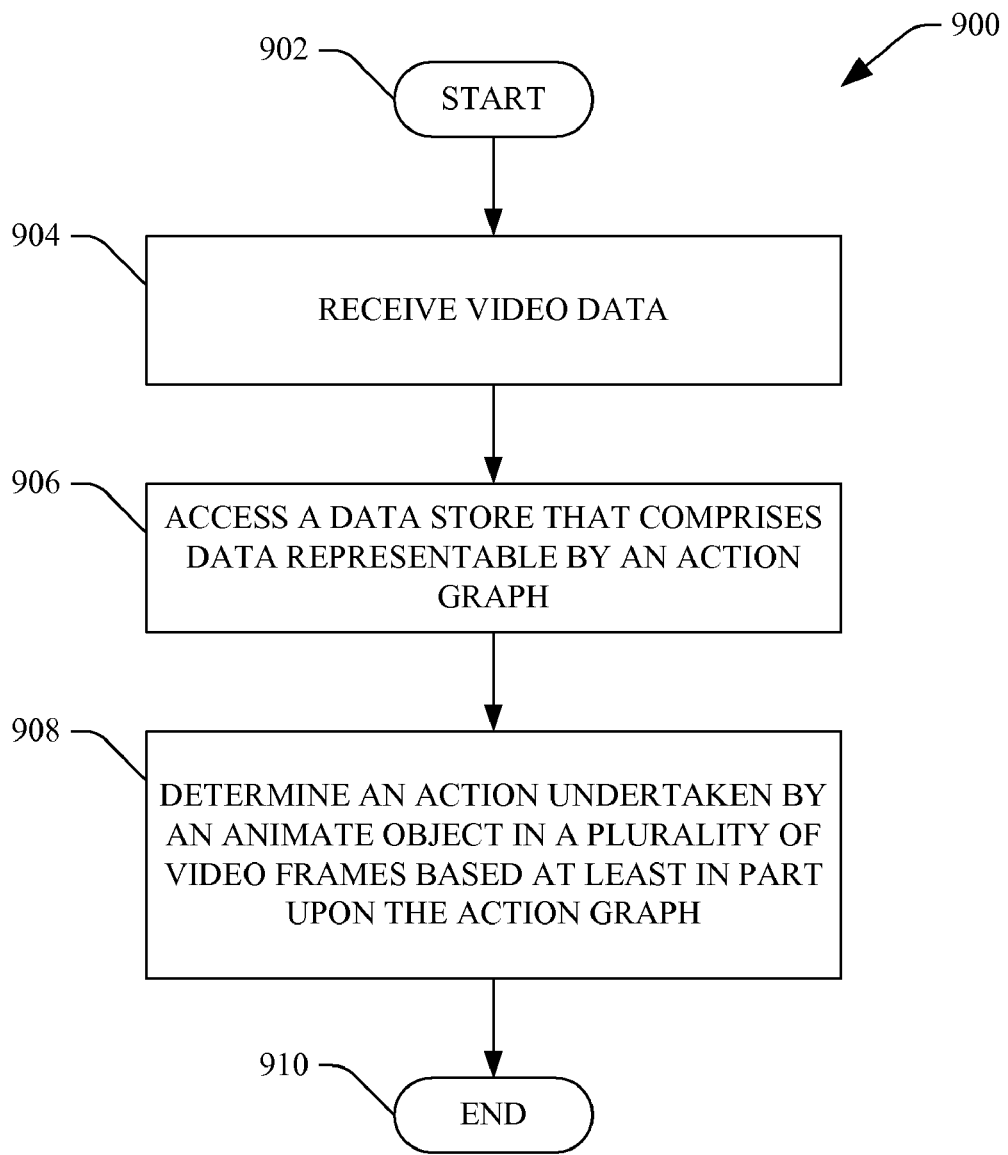
FIG. 9 is a flow diagram that illustrates an example methodology for recognizing an action of an animate object in video data.

Referring now to FIG. 9, an example methodology 900 for recognizing an action being undertaken by an animate object in a video is illustrated. The methodology 900 starts at 902, and at 904 video data is received, wherein the video data can include a plurality of video frames that comprise images of an animate object.

At 906, a data store is accessed that comprises data representable by an action graph. For instance, the action graph can include a plurality of nodes that are representative of a plurality of postures of animate objects. These nodes can be referred to as posture models. Further, at least one node of the action graph can correspond to multiple actions that are determinable through use of the action graph. For instance, a posture may be common between actions of walking and running, and a node can represent such posture with respect to both actions in the action graph.

At 908, an action undertaken by the animate object in the plurality of video frames is determined based at least in part upon the action graph. For instance, determining the action may include extracting features from video data received at 904. Further, determining the action may comprise determining at least one posture of the animate object in the video data based at least in part upon the extracted features. The methodology 900 then completes at 910.

Figure 10:
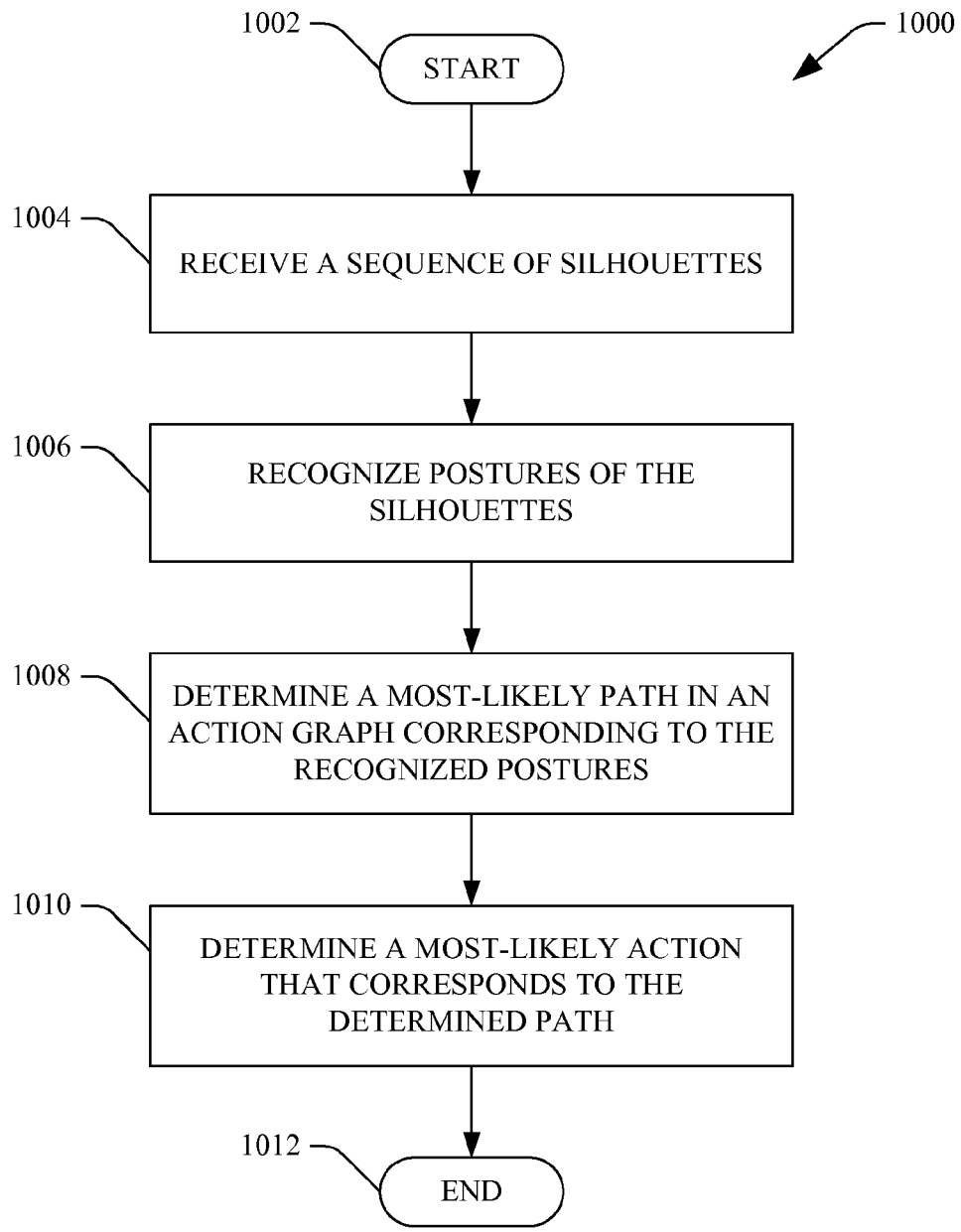
FIG. 10 is a flow diagram that illustrates an example methodology for recognizing an action of an animate object in video data.

Turning now to FIG. 10, an example methodology 1000 for determining an action undertaken by a human being captured in video data is illustrated. The methodology 1000 starts at 1002, and at 1004 a sequence of silhouettes are received. For instance, video data can be sampled and silhouettes of human beings can be generated.

At 1006, postures corresponding to the silhouettes can be recognized. For instance, contours of the human being in the video frame can be generated, and such contours can be compared with postures in the action graph.

At 1008, a most-likely path in the action graph that corresponds to the recognized postures is determined. For instance, the action graph can have corresponding transitional probabilities (global and local), and a most likely path can be determined based at least in part upon the recognized postured and the transitional probabilities.

At 1010, a most-likely action that corresponds to the determined path can be determined. For instance, a particular probability that a sequence of silhouettes in the video frame corresponds to a particular action can be determined, and if the probability is above a threshold the most-likely action can be output as a determined action. The methodology 1000 then completes at 1012.

Figure 11:
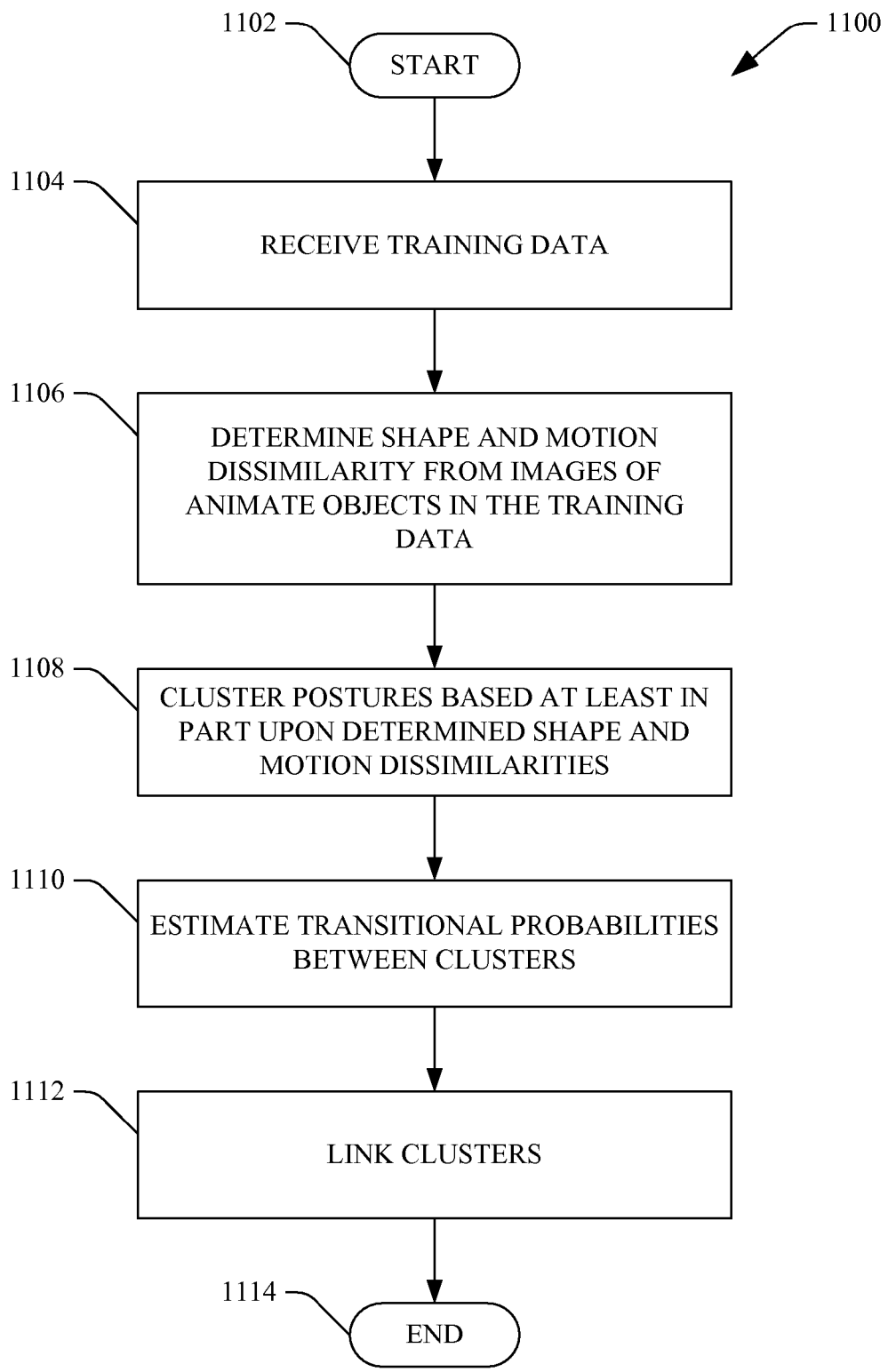
FIG. 11 is a flow diagram that illustrates an example methodology for learning an action graph.

Referring now to FIG. 11, a methodology 1100 for learning an action graph is illustrated. The methodology 1100 starts at 1102, and at 1104 training data is received. Pursuant to an example, the training data may be a plurality of sequences of video data that includes an animate object moving in accordance with a particular action. For instance, the plurality of sequences of video data may be silhouettes, although other training data is also contemplated.

At 1106, shape and motion dissimilarities are determined from images of animate objects in the training data. At 1108, postures are clustered based at least in part upon the determined shape and motion dissimilarities.

At 1110, transitional probabilities are estimated between clusters. Estimation of transitional probabilities has been described in detail above. At 1112 clusters (e.g., posture models) are linked. The methodology 1100 completes at 1114.

Figure 12:
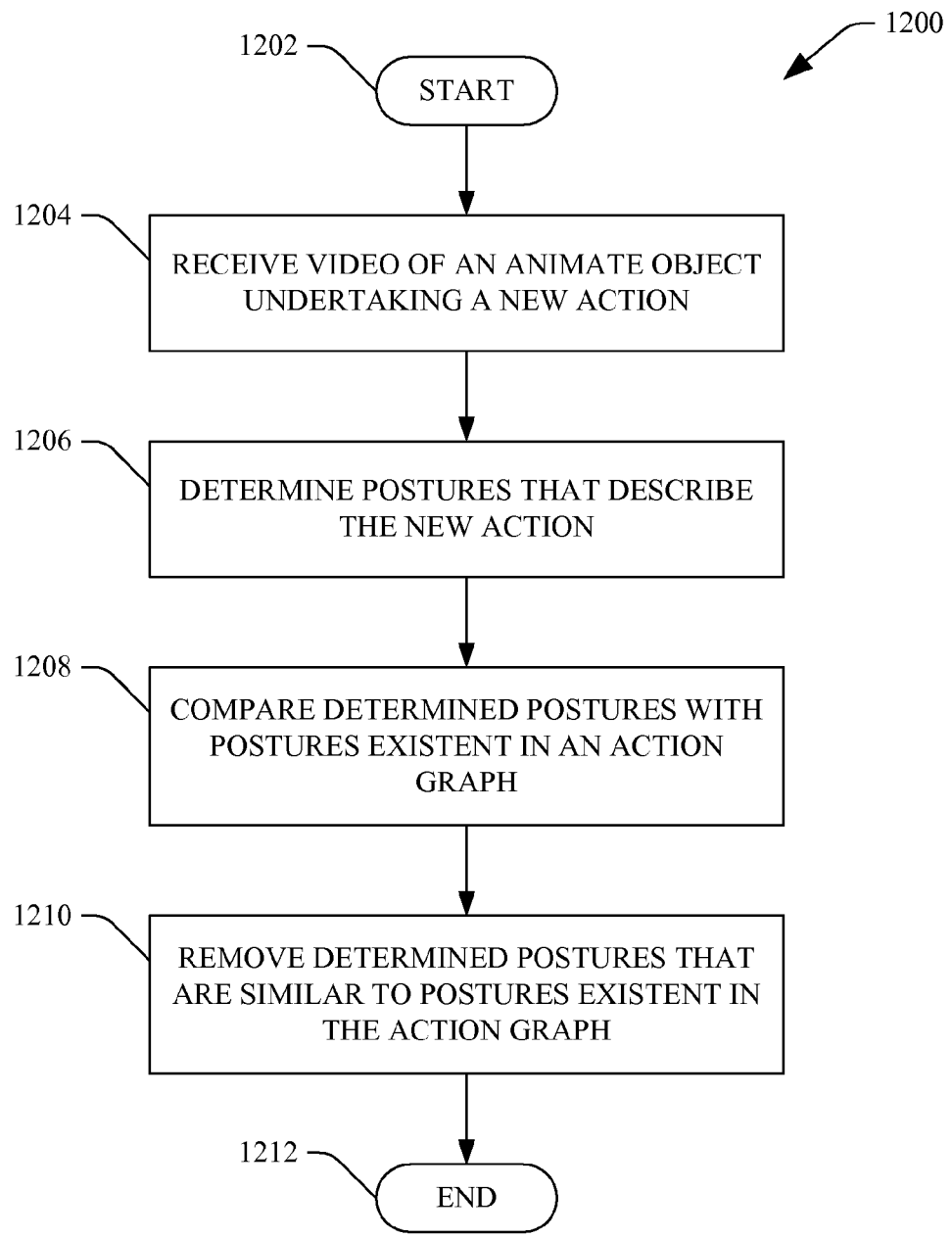
FIG. 12 is a flow diagram that illustrates an example methodology for updating an action graph with a new action.

With reference now to FIG. 12, an example methodology 1200 that facilitates adding an action to an existing action graph is illustrated. The methodology 1200 starts at 1202, and at 1204 a video of an animate object undertaking a new action is received, wherein "new action" refers to an action that has not yet been supported in an underlying action graph. At 1206, postures that describe the new action are determined, and at 1208 the determined actions are compared with postures existent in the underlying action graph. At 1210 determined postures that are found to be similar to postures existent in the underlying action graph are removed from the action graph. The methodology 1200 then completes at 1212.

Figure 13:
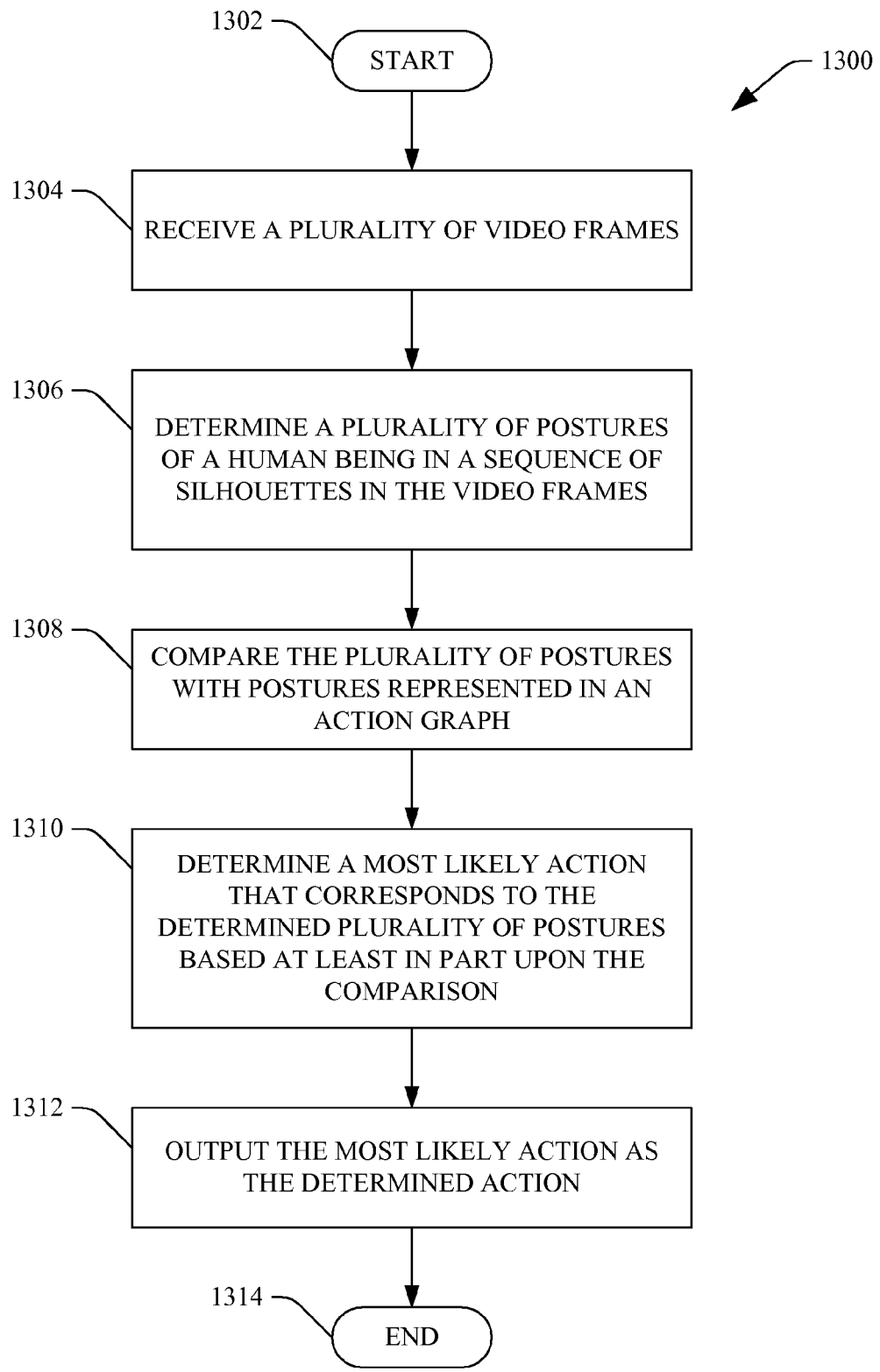
FIG. 13 is a flow diagram that illustrates an example methodology for recognizing an action of an animate object in video data.

Now referring to FIG. 13, an example methodology 1300 that facilitates outputting a most-likely determined action is illustrated. The methodology 1300 starts at 1302, and at 1304 a plurality of video frames are received. For instance, the plurality of video frames can include a sequence of silhouettes of a human being. At 1306, a plurality of postures of the human being in the sequence of silhouettes are determined.

At 1308, the plurality of postures are compared with postures represented in an action graph. Pursuant to an example, the action graph can include multiple postures pertaining to numerous actions. Further, a first posture in the action graph may be linked to a second posture in the action graph by a probability that for a first action the human being will transition from the first posture to the second posture. In yet another example, at least one posture in the action graph can correspond to more than one action.

At 1310, a most likely action that corresponds to the determined plurality of postures can be determined based at least in part upon the comparison. At 1312, the most likely action can be output as a determined action. The methodology 1300 completes at 1314.

Figure 14:
FIG. 14 is an example silhouette.

Referring briefly to FIG. 14, an example depiction of a silhouette 1400 of a human being is illustrated. The silhouette may be received in connection with determining an action undertaken by a human that is represented by the silhouette. In another example, the silhouette may be used as training data.

Figure 15:
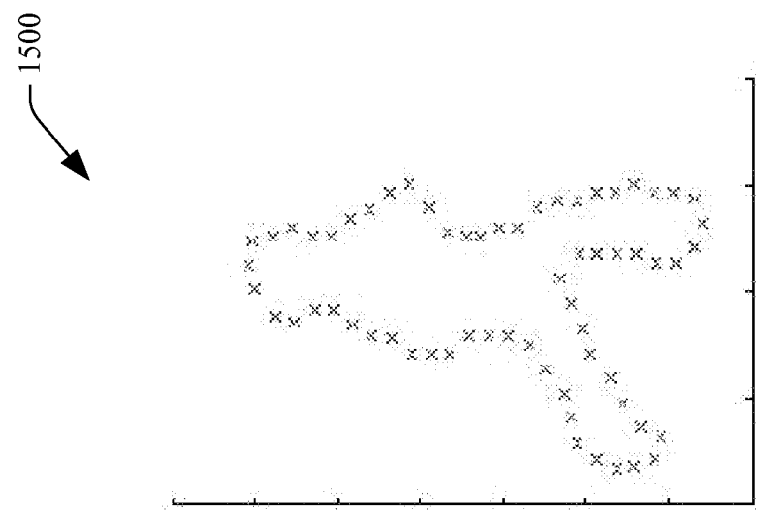
FIG. 15 is an example shape contour.

Turning to FIG. 15, an example resampled image 1500 is depicted, wherein the resampled image includes multiple points that represent a contour. Such a contour may be used in connection with determining shape dissimilarity between the contour and another contour, for example.

Figure 16:
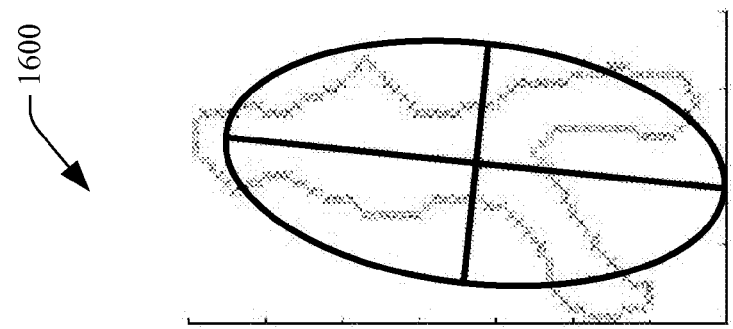
FIG. 16 is an example depiction of a shape contour fitted with an ellipse.

With reference to FIG. 16, an example oriented image 1600 is depicted, wherein an ellipse is fit over the contour and a center of gravity is discerned. Such information can be used in connection with determining dissimilarity of motion between contours.

Figure 17:
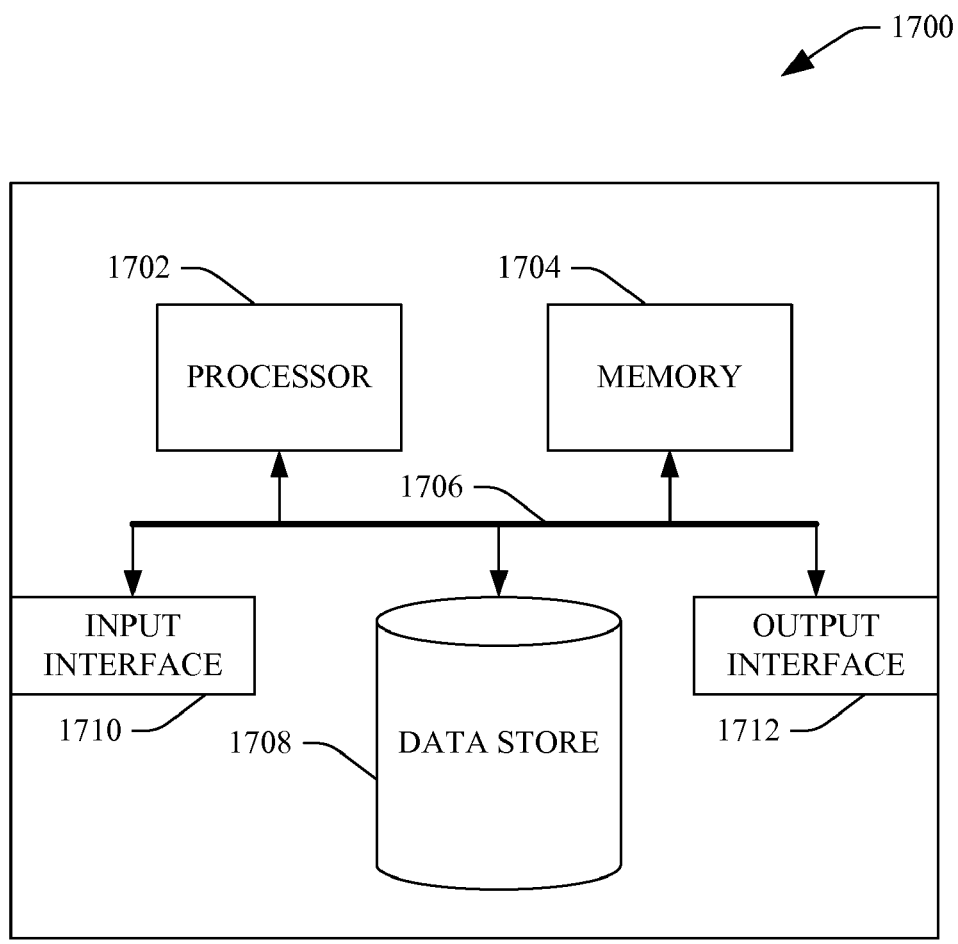
FIG. 17 is an example computing system.

Now referring to FIG. 17, a high-level illustration of an example computing device 1700 that can be used in accordance with the systems and methodologies disclosed herein is illustrated. For instance, the computing device 1700 may be used in a system that can be used to determine an action undertaken by an animate object in video data and/or used to learn a system that can be used to automatically determine actions in video data. The computing device 1700 includes at least one processor 1702 that executes instructions that are stored in a memory 1704. The instructions may be, for instance, instructions for implementing functionality described as being carried out by one or more components discussed above or instructions for implementing one or more of the methods described above. The processor 1702 may access the memory by way of a system bus 1706. In addition to storing executable instructions, the memory 1204 may also store images, one or more action graphs, etc.

The computing device 1700 additionally includes a data store 1708 that is accessible by the processor 1702 by way of the system bus 1706. The data store 1708 may include executable instructions, silhouettes, training data, etc. The computing device 1700 also includes an input interface 1710 that allows external devices to communicate with the computing device 1700. For instance, the input interface 1710 may be used to receive instructions from an external computer device, receive video data from a video source, etc. The computing device 1700 also includes an output interface 1712 that interfaces the computing device 1700 with one or more external devices. For example, the computing device 1700 may transmit data to a personal computer by way of the output interface 1712.

Additionally, while illustrated as a single system, it is to be understood that the computing device 1700 may be a distributed system. Thus, for instance, several devices may be in communication by way of a network connection and may collectively perform tasks described as being performed by the computing device 1700.

While the systems and methods discussed above have been described in connection with determining actions undertaken by an animate object, it is to be understood that concepts described herein may be extended to other domains. For instance, the systems and methods discussed above may be used in connection with voice detection, where nodes of the action graph can represent particular pitches of the human voice, and wherein transitional probabilities can be probabilities pertaining to changes in pitch for particular words or phrases. In another example, postures of a human mouth may be determined and used to recognize words spoken from the human mouth.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
    receiving video data, wherein the video data includes a plurality of video frames that comprise an animate object;
    accessing a data store that comprises data representable by an action graph responsive to receiving the video data, the action graph including a plurality of nodes, representative of a plurality of possible postures of the animate object, and at least one node of the action graph corresponding to multiple actions determinable through use of the action graph;
    probabilistically identifying a sequence of nodes in the action graph based upon respective postures of the animate object in the plurality of video frames; and
    determining an action undertaken by the animated object in the plurality of video frames based at least in part upon the probabilistically identifying the sequence of nodes in the action graph.

2. The method of claim 1, wherein the animate object is a human being.

3. The method of claim 1, wherein the act of determining comprises determining a most likely path in the action graph that corresponds to images in the plurality of video frames.

4. The method of claim 3, wherein the act of determining comprises:
    extracting features from the received video data pertaining to the animate object; and
    determining at least one posture of the animate object in the video data based at least in part upon the extracted features.

5. The method of claim 3, further comprising determining a likelihood of each of the multiple determinable actions based at least in part upon the received video data.

6. The method of claim 5, wherein the act of determining the likelihood of each of the multiple determinable actions comprises using one or more of Action Specific Viterbi Decoding, Unigram with Global Viterbi Decoding, Bi-gram with Global Viterbi Decoding, Uni-gram with Maximum Likelihood Decoding, or Bi-gram with Maximum Likelihood Decoding.

7. The method of claim 1, wherein the action graph includes transitional probabilities between multiple postures.

8. The method of claim 1, further comprising annotating the video data based at least in part upon the determined action.

9. The method of claim 1, further comprising:
    receiving training data;
    determining shape and motion dissimilarities with respect to images of animate objects in the training data; and
    clustering postures based at least in part upon the determined shape and motion dissimilarities.

10. The method of claim 9, further comprising estimating transitional probabilities between clustered postures.

11. The method of claim 10, further comprising:
    receiving a video of an animate object undertaking a new action;
    determining postures that describe the new action;
    comparing determined actions with postures existent in the action graph; and
    removing from the action graph determined postures that are found to be similar to postures existent in the action graph.

12. A system that facilitates automatically determining an action of an animate object in received video data comprises the following computer-executable components:
    a receiver component that receives video data that includes images of an animate object; and
    a determiner component that accesses a data store that includes an action graph and automatically determines an action undertaken by the animate object in the received video data based at least in part upon the action graph, wherein the action graph comprises a plurality of nodes that are representative of multiple possible postures of the animate object, and wherein at least one node in the action graph is shared amongst multiple actions represented in the action graph.

13. The system of claim 12, wherein actions represented in the action graph comprise running, walking, and sliding.

14. The system of claim 12, wherein the animate object is a human being.

15. The system of claim 12, wherein the received video data comprises a plurality of silhouettes of the animate object.

16. The system of claim 12, further comprising:
- a posture recognizer component that recognizes a plurality of salient postures of the animate object in the received video data;
- a path determiner component that determines a most likely path in the action graph that corresponds to a sequence of received images in the video data; and
- a probability determiner component that determines a likelihood of each action represented in the action graph.

17. The system of claim 12, further comprising an annotater component that annotates portions of the video data with information pertaining to the determined action.

18. The system of claim 12, further comprising a learner component that receives posture samples and learns the action graph based at least in part upon the received posture samples.

19. The system of claim 18, further comprising:
- a shape dissimilarity determiner component that determines dissimilarity between different shape descriptors, wherein the shape descriptors are based at least in part upon the posture samples;
- a motion dissimilarity determiner component that determines motion dissimilarity between motion feature vectors pertaining to the posture samples;
- a clusterer component that creates clusters of posture samples based at least in part upon dissimilarity between different posture samples.

20. A computer-readable data storage device comprising instructions that, when executed by a processor, cause the processor to perform acts comprising:
- receiving a plurality of video frames, wherein the plurality of video frames include a sequence of silhouettes of a human being;
- determining a plurality of postures of the human being in the sequence of silhouettes;
- comparing the plurality of postures with postures represented in an action graph, wherein the action graph includes multiple postures pertaining to numerous actions, and wherein a first posture in the action graph is linked to a second posture in the action graph by a probability that for a first action the human being will transition from the first posture to the second posture, and wherein at least one posture in the action graph corresponds to more than one action;
- determining a most likely action that corresponds to the determined plurality of postures based at least in part upon the comparison; and
- outputting the most likely action as a determined action.

* * * * *